United States Patent
Laudebat et al.

(10) Patent No.: US 9,941,706 B2
(45) Date of Patent: Apr. 10, 2018

(54) WIRELESS POWER SAFETY COMPONENT

(71) Applicant: Intel Corporation, Santa Clara, CA (US)

(72) Inventors: Remi Laudebat, Sophia Antipolis (FR); Ahmad Khoshnevis, Portland, OR (US); Shahar Porat, Geva Carmel (IL)

(73) Assignee: Intel Corporation, Santa Clara, CA (US)

( * ) Notice: Subject to any disclaimer, the term of this patent is extended or adjusted under 35 U.S.C. 154(b) by 614 days.

(21) Appl. No.: 14/495,441

(22) Filed: Sep. 24, 2014

(65) Prior Publication Data

US 2016/0087447 A1    Mar. 24, 2016

(51) Int. Cl.
| | | |
|---|---|---|
| *H04B 5/00* | (2006.01) | |
| *H02J 5/00* | (2016.01) | |
| *H02J 7/00* | (2006.01) | |
| *H02J 17/00* | (2006.01) | |

(52) U.S. Cl.
CPC ............ *H02J 5/005* (2013.01); *H02J 7/0031* (2013.01); *H02J 17/00* (2013.01); *H04B 5/0037* (2013.01)

(58) Field of Classification Search
CPC .......... H02J 5/005; H02J 17/00; H02J 7/0031; H02J 7/025; H04B 5/0037
See application file for complete search history.

(56) References Cited

U.S. PATENT DOCUMENTS

| | | |
|---|---|---|
| 2010/0311327 A1 | 12/2010 | Hamada |
| 2012/0050015 A1 | 3/2012 | Low et al. |
| 2012/0153894 A1 | 6/2012 | Widmer |
| 2013/0176653 A1 | 7/2013 | Kim et al. |
| 2013/0219157 A1 | 8/2013 | Lee et al. |
| 2013/0257364 A1* | 10/2013 | Redding .................. H02J 5/005 320/108 |
| 2014/0015331 A1 | 1/2014 | Kim et al. |
| 2014/0148095 A1 | 5/2014 | Smith et al. |
| 2015/0357829 A1* | 12/2015 | Makita .................... H02J 17/00 307/104 |

FOREIGN PATENT DOCUMENTS

| | | |
|---|---|---|
| TW | 201415752 A | 4/2014 |
| WO | 2009123077 A1 | 10/2009 |

OTHER PUBLICATIONS

European Search Report, European Application No. 15181777, dated Jan. 29, 2016, 6 pages.
Taiwan IPO Search Search Report, Taiwan Patent Application No. 104126887, date of completion Aug. 8, 2016, 2 pages.

* cited by examiner

*Primary Examiner* — Daniel Kessie
*Assistant Examiner* — Terrence Willoughby
(74) *Attorney, Agent, or Firm* — International IP Law Group, P.L.L.C.

(57) ABSTRACT

Techniques of providing increased safety for wireless systems are described herein. A wireless power receiving unit includes a first receiving coil to inductively couple to a wireless power transmitting unit having a transmitting coil. A safety component is provided to reduce wireless power received at a second receiving coil from the wireless power transmitting unit.

10 Claims, 10 Drawing Sheets

WIRELESS POWER SAFETY COMPONENT

TECHNICAL FIELD

This disclosure relates generally to techniques for wireless charging. Specifically, this disclosure relates to safety in wireless charging systems.

BACKGROUND

A basic wireless charging system may include a wireless power transmitter unit (PTU) and a wireless power receiving unit (PRU). For example, a PTU may include a transmit (Tx) coil, and a PRU may include receive (Rx) coil. Magnetic resonance wireless charging may employ a magnetic coupling between the Tx coil and the Rx coil. In some scenarios, a wireless PRU may be used in a device having another type of wireless coil, such as a near field communication (NFC) coil. In these scenarios, a resonance frequency associated with wireless charging may damage the NFC coil.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

The present disclosure relates generally to techniques for safety components at a power receiving unit (PRU). As discussed above, magnetic resonance wireless charging systems may employ a magnetic coupling between a power transmitting unit (PTU) having a transmit (Tx) coil, and a PRU having a receive (Rx) coil. However, in some cases, a device containing a wireless power receiving coil may also contain a second coil for data wireless data communication. For example, a mobile, such as a smart phone, may contain a first coil for wireless power charging and a second coil for near field communication (NFC). In some scenarios, the resonance frequency of wireless charging may be multiple of the resonance frequency associated with data transfer operations of second coil.

For example, an NFC frequency may be 13.56 megahertz (MHz) while the wireless charging frequency may be 6.78 MHz, or 13.56 multiplied by 0.5. As a consequence, the NFC antenna may receive wireless power from a PTU that may damage the NFC system, including an NFC controller.

The aspects described herein include a safety component used to reduce power received at a second receiving coil of a given device during wireless charging operations. Additionally or alternately, the aspects described herein further include a safety component that may reduce wireless charging operations during data communications of a second wireless receiving coil, such as during operations of an NFC system.

Figure 1:
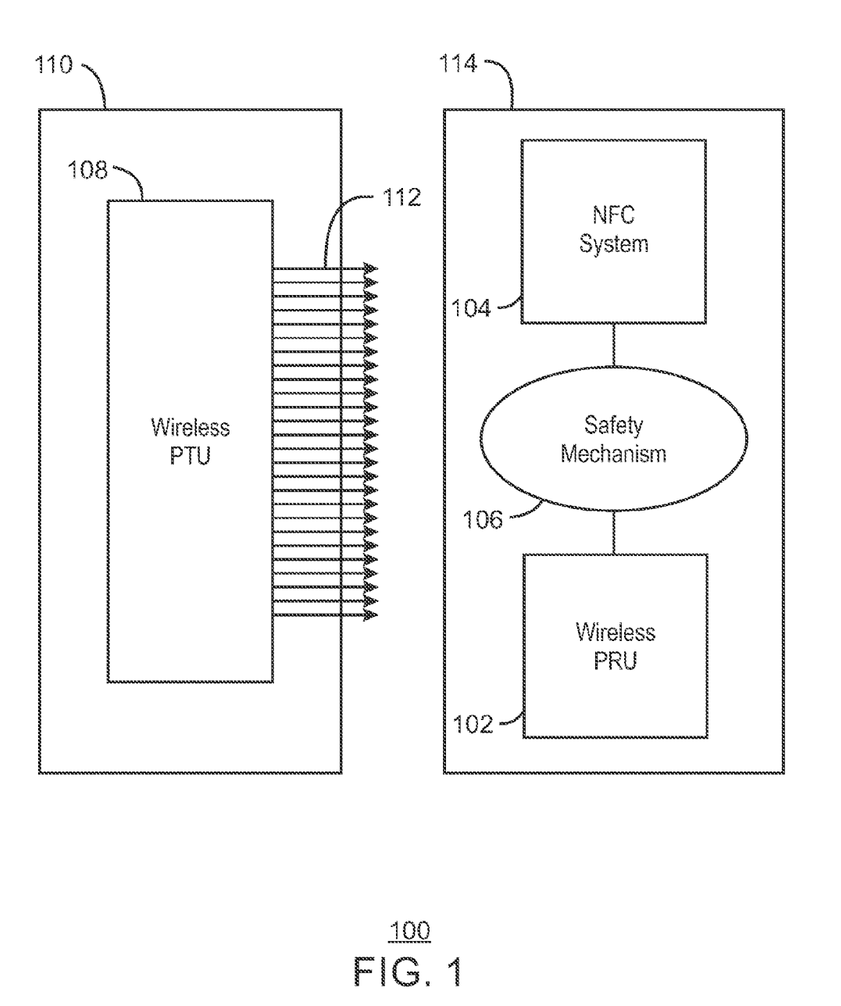
FIG. 1 is block diagram illustrating a power receiving unit having a safety component.

FIG. 1 is block diagram illustrating a power receiving unit having a safety component. The wireless power receiving unit (PRU) 102 may be coupled to a wireless data communication system, such as the NFC system 104 via a safety component 106. Although aspects described herein discuss NFC as an example of a wireless data communication system, other systems having receiving coils capable of potentially inductively coupling to a wireless power transmitting unit (PTU) 108 are contemplated. The PTU 108 may be a component of a wireless charging device 110 wherein the PTU 108 may be coupled to the PRU 102 via magnetic inductive coupling, as indicated by the arrows 112. The wireless PRU 102, the NFC system 104, and the safety component 106, may be components of a computing device 114, such as a laptop, a mobile phone, a smart phone, or any other computing device configured to receive power wirelessly.

As discussed above and in more detail below, the safety component 106 may reduce power received at the NFC system 104. The power may be reduced in response to wireless charging operations being initiated. In some cases, the wireless charging operations may be reduced in response to NFC operations being initiated. In either scenario, the safety component 106 enables coexistence of wireless charging systems and wireless data communication systems.

Figure 2:
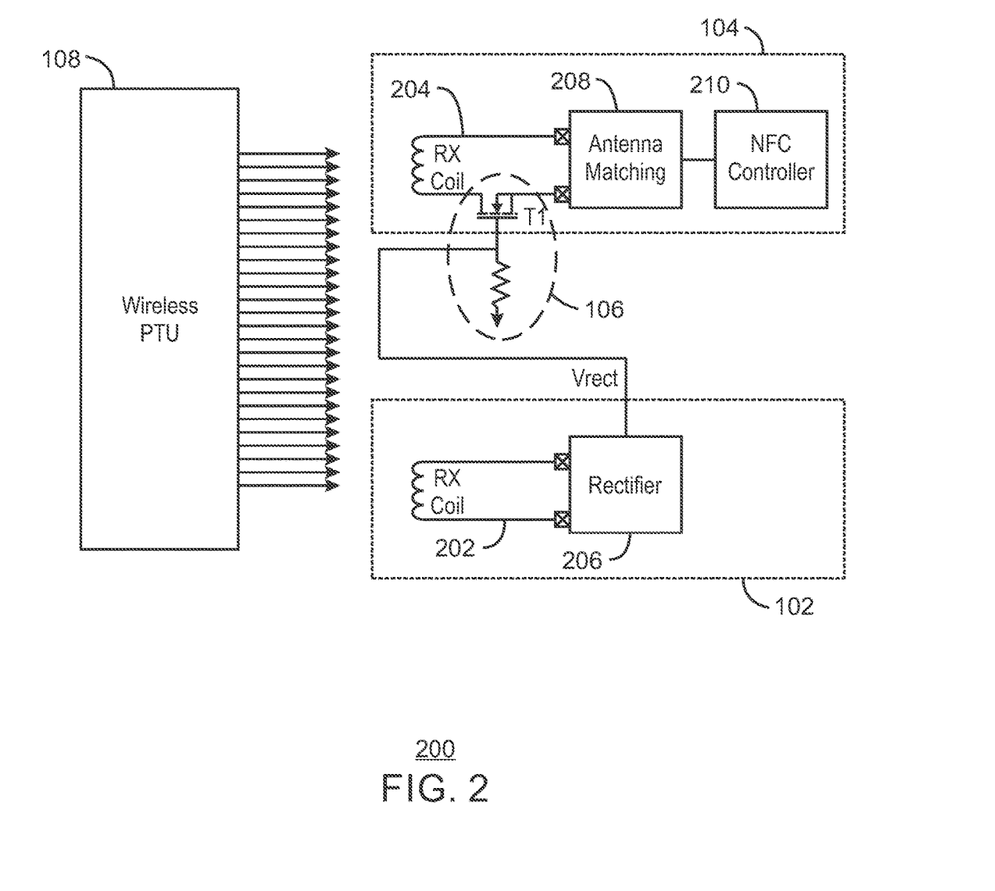
FIG. 2 is a diagram illustrating an example of a safety component.

FIG. 2 is a diagram illustrating an example of a safety component. In the example illustrated in FIG. 2, the wireless PTU 108 may be configured to inductively couple to a receiving (Rx) coil 202 of the wireless PRU 102. However, the wireless PTU 108 may, in some cases, couple to a receiving (Rx) coil 204 of the NFC system 104. The safety component 106 may reduce power received at Rx coil 204 of the NFC system 104 during wireless charging.

For example, as power is received at the Rx coil 202, a rectifier 206 of the wireless PRU 102 may initiate. A coupling including a switch, such as a field effect transistor indicated in the circled portion 106 of FIG. 2, may decouple the Rx coil 204 of the NFC system 104 from an antenna matching component 208 and an NFC controller 210. The field effect transistor is an example of the safety component 106. As discussed in more detail below, other arrangements are contemplated. Further, as discussed below in regard to FIG. 4, the safety component 106 may be initiated during initial wireless charging operations when inductive coupling transfers a much lower power than during subsequent wireless charging operations.

Figure 3:
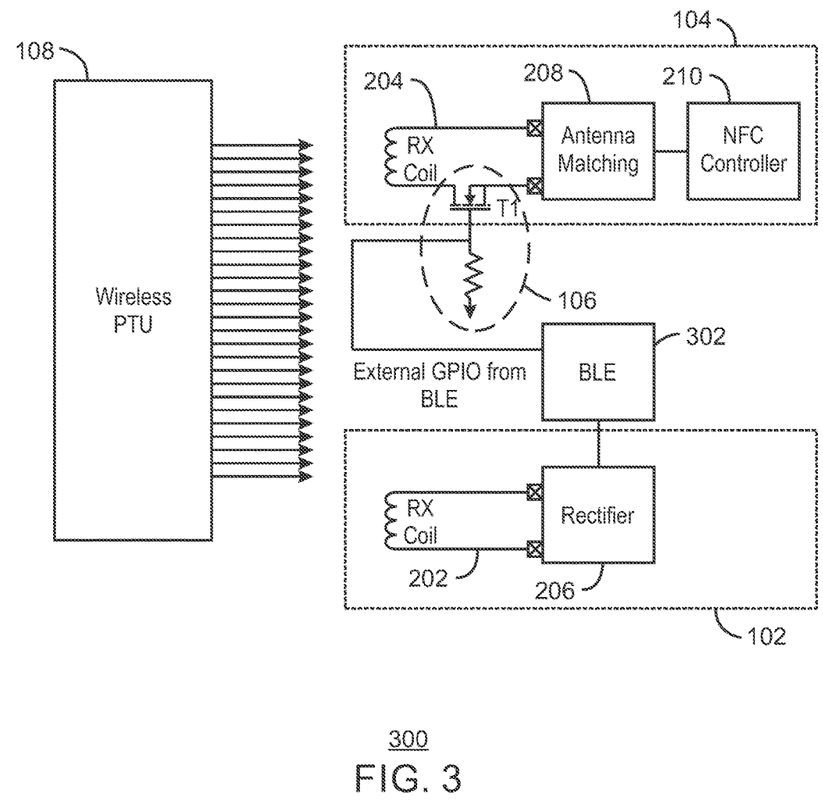
FIG. 3 is a diagram illustrating another example of a safety component.

FIG. 3 is a diagram illustrating another example of a safety component. In some cases, the wireless PRU 102 may be connected to, or may include, a Bluetooth low energy (BLE) module 302 configured to provide BLE signals to the wireless PTU 108, and receive BLE signals from the wireless PTU 108. As discussed in more detail below, BLE signals may be used during certain stages of wireless charging operation. For example, during initialization, the BLE module 302 may provide a BLE advertisement after receiving a power beacon from the wireless PTU 108. Upon receiving the power beacon, the initialization of the BLE may enable to the safety component 106 to reduce power received at the Rx coil 204 by way of the field effect transistor indicated within the circle 106.

Figure 4:
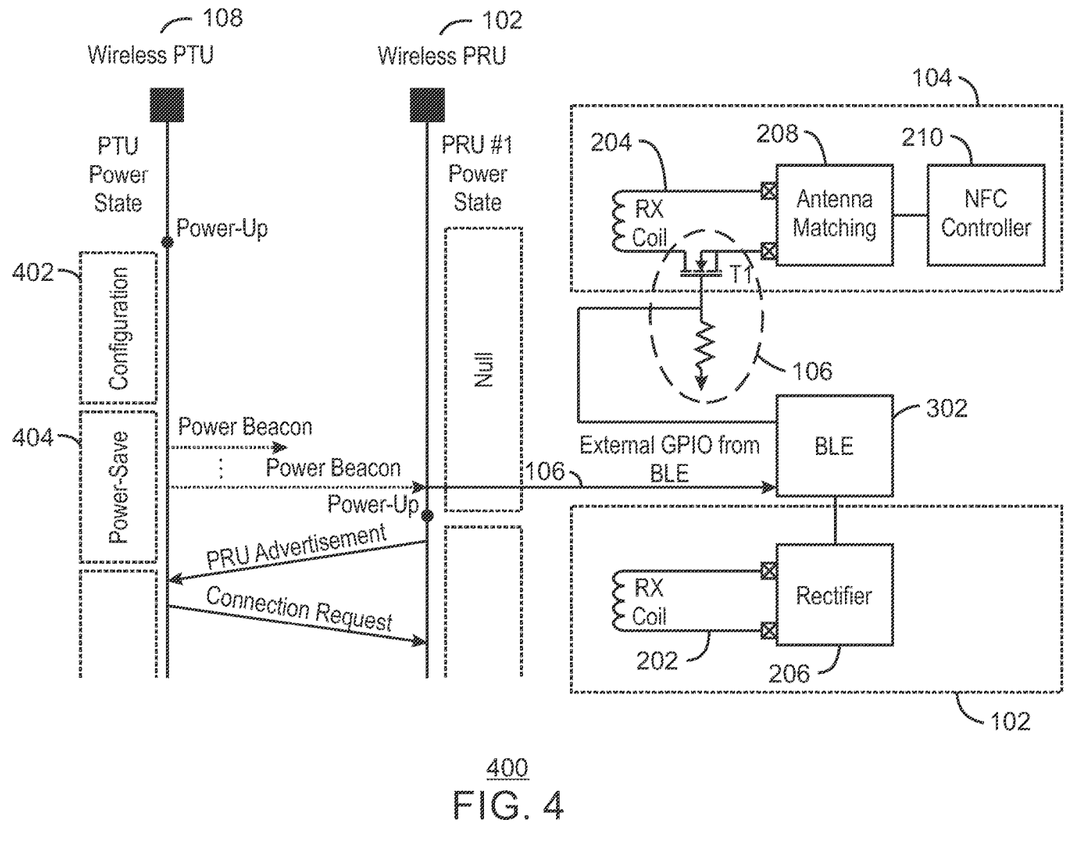
FIG. 4 is a diagram illustrating timing of a safety component in view of power beacons provided by a wireless PTU.

FIG. 4 is a diagram illustrating timing of a safety component in view of power beacons provided by a wireless PTU. During initialization, the PRU 108 may power up and enter a configuration state 402 and then a power-save state 404 wherein a power beacon may be transmitted. The power beacon may be a low power beacon in comparison to power transmitted during wireless power charging. Upon receiving the power beacon, the BLE 302 will initiate, as indicated by the arrow 406.

Figure 5:
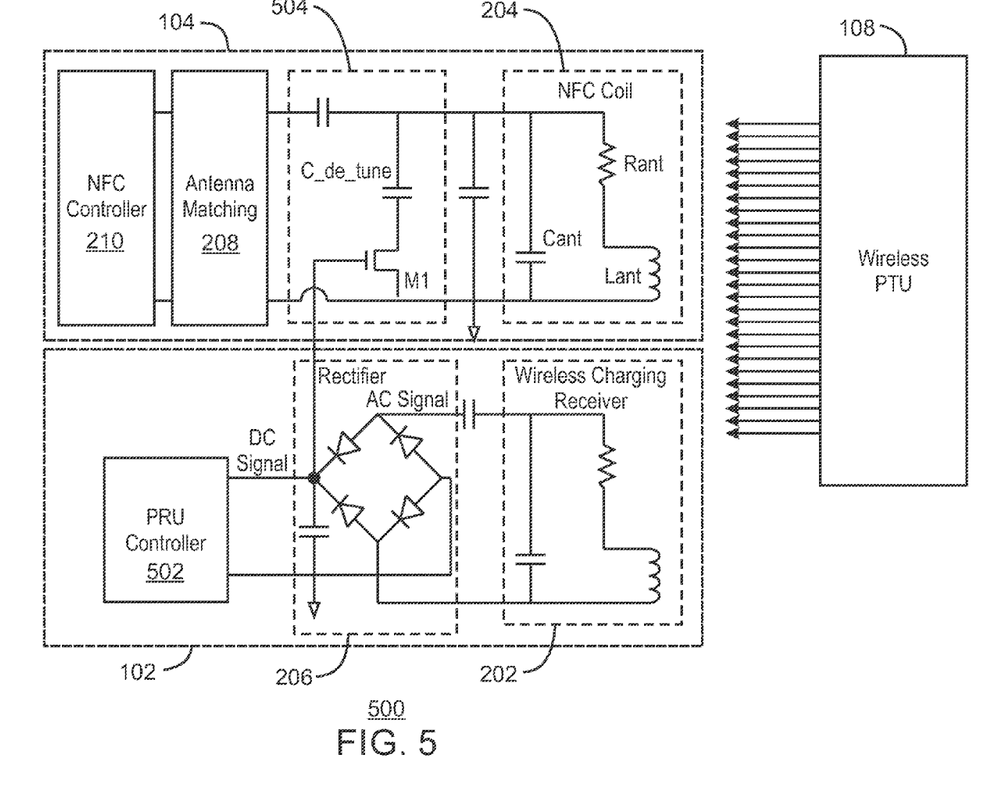
FIG. 5 is a diagram illustrating yet another example of a safety component to reduce power received at a second coil.

FIG. 5 is a diagram illustrating yet another example of a safety component to reduce power received at a second coil. The Rx coil 202 may inductively couple to the wireless PTU 108 including a transmitting coil. The rectifier, indicated by the dashed box 206 may convert an alternating current to a direct current, as illustrated in FIG. 5, before providing the direct current to a PRU controller 502.

The rectifier 206 may be coupled to a detuning circuit, generally indicated by the dashed box 504. The detuning circuit 504 may adjust the resonance frequency of the NFC system 104 in response to the alternating current to direct current conversion at the rectifier 206. In aspects, the detuning occurs only when the direct current is at or higher than a voltage threshold. Once the direct current is at or higher than the voltage threshold, a capacitor "C_de_tune" will initiate resulting in a detuning of the NFC coil 204.

Figure 6:
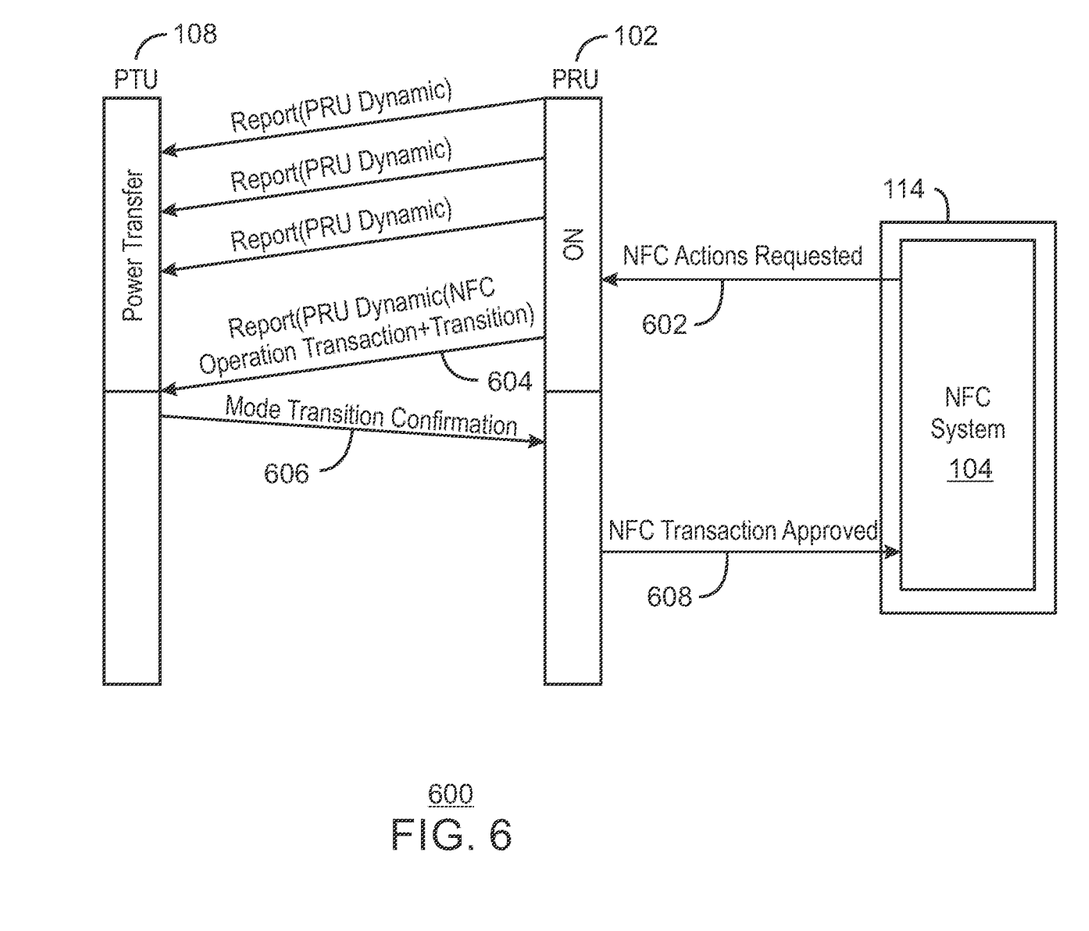
FIG. 6 is a diagram illustrating a safety component initiated by an NFC system.

FIG. 6 is a diagram illustrating a safety component initiated by an NFC system. As discussed above, the safety component 106 may be initiated by power beacons provided by a wireless PTU, such as the wireless 108 of FIG. 1. In some cases, the safety component 106 may also interrupt wireless charging to perform NFC operations, such as a NFC transaction. In this scenario, the NFC system 104 may indicate to the wireless PRU system 102 that NFC actions have been requested, as indicated at 602 of FIG. 6. The wireless PRU system 102 may communicate a signal indicating a NFC transaction and mode transition is requested, as indicated at 604. In aspects, the wireless PRU system 102 may communicate the mode transition and request via a BLE signal. The wireless PRU 108 may reduce or cease wireless charging upon receiving the report at 604. At 606, mode transition confirmation is provided from the wireless PTU system 108 to the wireless PRU system 102, and an approval is provided to the NFC system 104 as indicated at 608.

Figure 7:
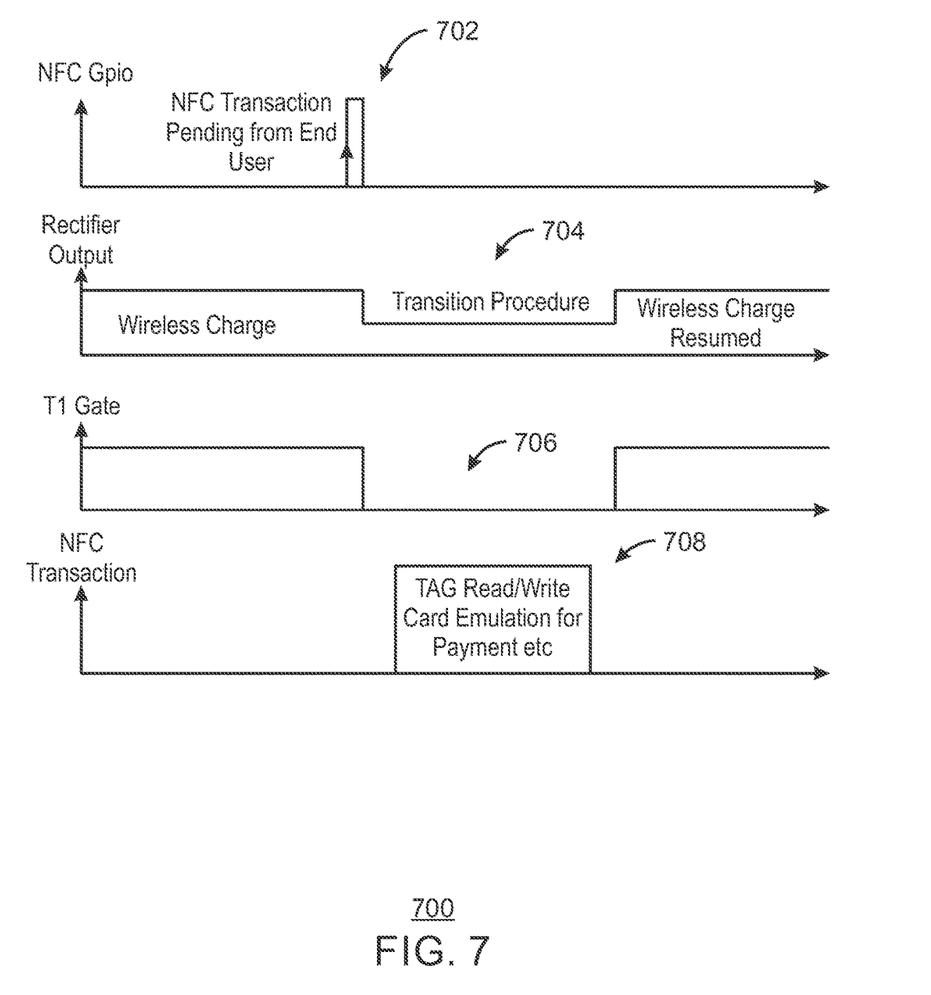
FIG. 7 is a diagram illustrating timing of signals associated with the safety component initiated by the NFC system.

FIG. 7 is a diagram illustrating timing of signals associated with the safety component initiated by the NFC system. As discussed above in regard to FIG. 6, the safety component 106 may include a method of reducing or ceasing wireless charging during an NFC operation. At 702, a pending NFC transaction is indicated at the output of an NFC system. At 704, the rectifier output decreases during the transition procedure. At 706, transistor, such as the transistor discussed above with regard to FIG. 2 and FIG. 3 low during the transition procedure, and the NFC transaction may occur, as indicated at 708, during the time of transition.

Although FIG. 7 indicates that the NFC request is initiated by an NFC system associated with the PRU. However, in some scenarios, the PTU may be associated with an NFC system as well, and the NFC system on the transmitting side may potentially initiate the request to transition from wireless power transmission to NFC operations.

Figure 8:
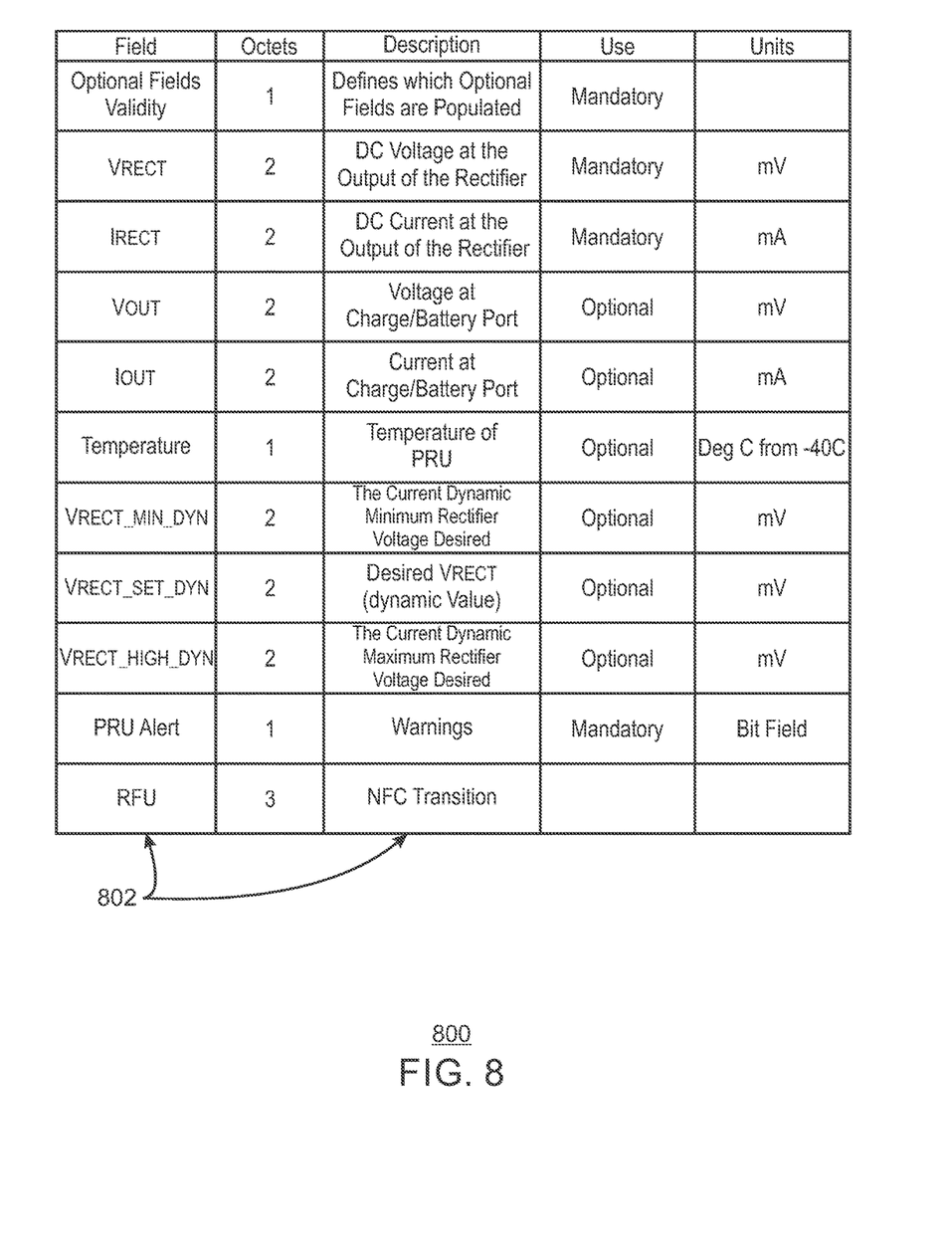
FIG. 8 is a table illustrating a field that may be used to advertise an anticipated NFC communication.

FIG. 8 is a table illustrating a field that may be used to advertise an anticipated NFC communication. In some scenarios, standard specifications may include a field 802 that is reserved for future use (RFU). This field 802 may be used to inform a wireless PTU whether or not the wireless PRU supports NFC operations, including transition requests, wherein the NFC operations may interrupt wireless charging as discussed above.

As illustrated in FIG. 8, a specification for wireless power may include parameters for dynamic signaling. In one aspect, one of the parameters may include NFC transition operations in the field 802 used to notify the PTU that the PRU wants to activate an associated NFC system. The parameters may also request a transition procedure as discussed above in regard to FIG. 6 and FIG. 7.

Figure 9:
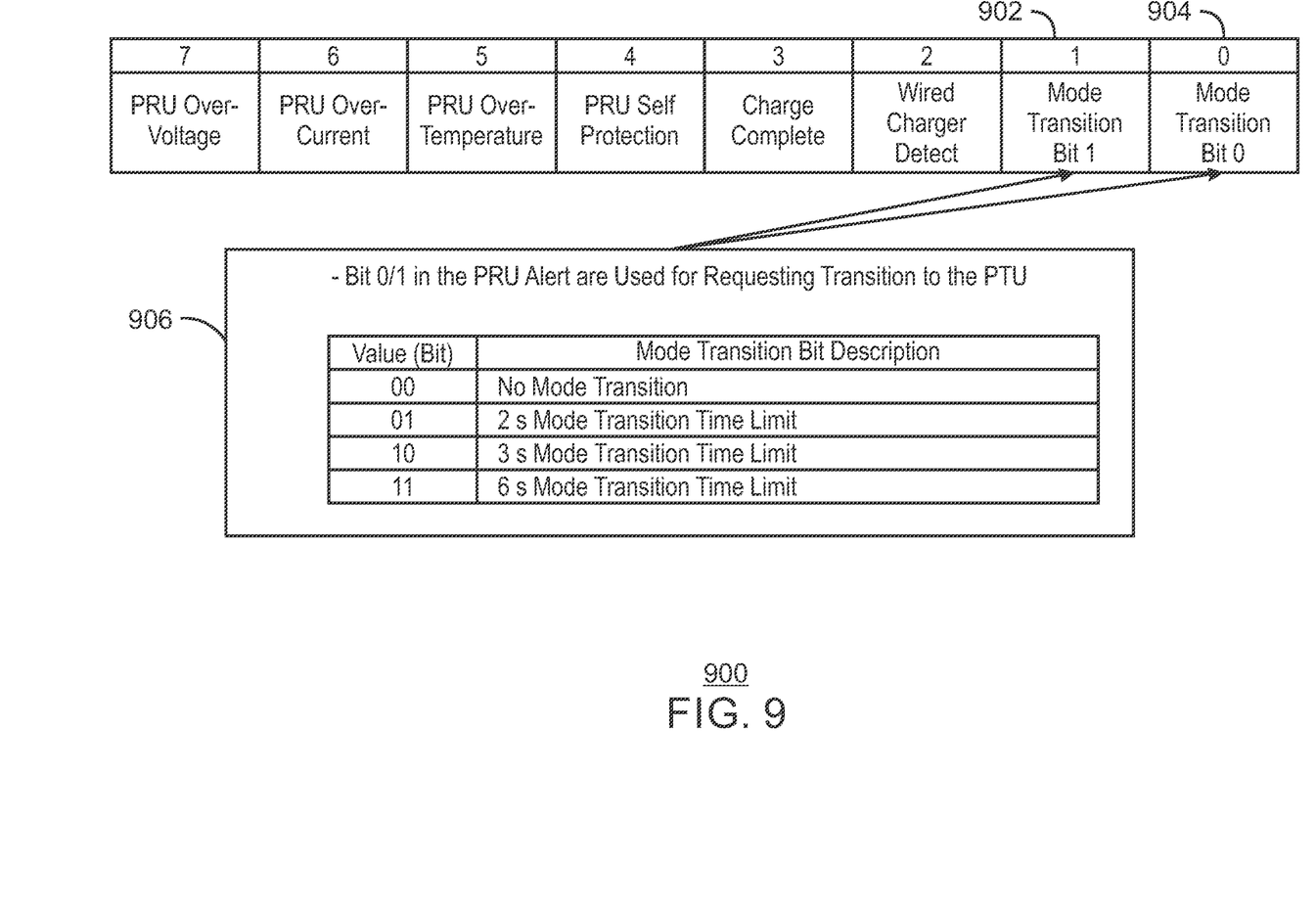
FIG. 9 is a table illustrating a bit field that may be used for power receiving unit alert notification.

FIG. 9 is a table illustrating a bit field that may be used for power receiving unit alert notification. In some cases, a wireless power charging standard, such as Alliance for Wireless Power (A4WP) Power Transfer System of Feb. 20, 2014, may include bit fields 902 and 904 that may be used to alert a PTU of subsequent NFC operations. In this scenario, the bit values, indicated in the table 906 may be used to indicate a transition time limit. Although not indicated in FIG. 9, bit values may be used to indicate to the PTU a type of subsequent NFC operation.

Figure 10:
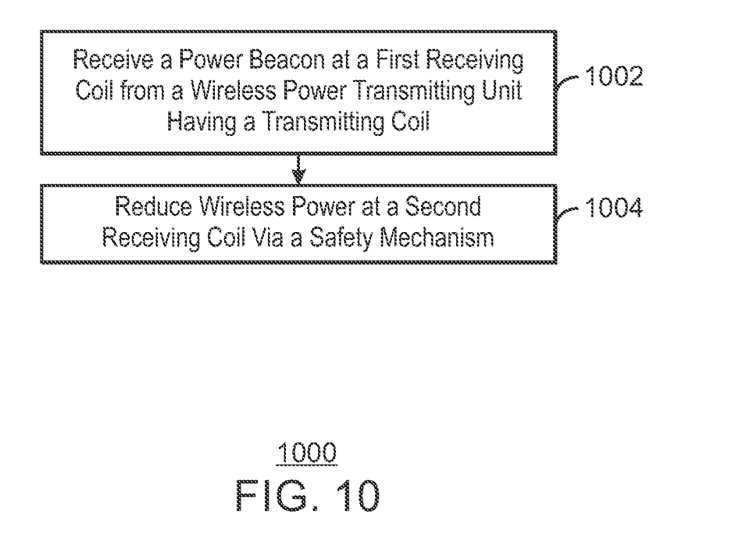
FIG. 10 is a block diagram illustrating a method for increasing safety of wireless charging systems.

FIG. 10 is a block diagram illustrating a method for increasing safety of wireless charging systems. At 1002, a power beacon is received at a first receiving coil from a wireless power transmitting unit having a transmitting coil. At block 1004, a safety component is initiated. The safety component is to reduce inductive coupling of the transmitting coil to a second receiving coil.

In some circumstances reducing the inductive coupling comprises preventing power from being received at the second receiving coil above a certain threshold. For example, an inductive coupling between the transmitting coil and the second receiving coil may be allowed during power beacon transmission. In this scenario, the power beacons may be relatively short, and at low power voltage, therefore, damage to a second receiving coil, such as an NFC coil, is relatively less likely than during a power charging mode of the transmitting coil.

As discussed above, the reduction may be carried out by a safety component. For example, the safety component may disconnect the second receiving coil from a controller associated with the second receiving coil. As another example, the safety component may detune the second receiving coil such that a resonance frequency of the power transmitted from the transmitting coil is not a resonance frequency of the second receiving coil, or a integer multiple of the resonance frequency.

In aspects, the method 1000 may include initiating a BLE module upon receiving the power beacon. The NFC coil may be disconnected from a NFC controller by a transistor coupling the BLE module to the NFC coil. In some scenarios, the transistor may couple the NFC coil directly to the first receiving coil, such as a wireless power receiving coil, or to a PRU as discussed above in regard to FIG. 2. In this scenario, wireless power indicating reception of the power beacon at a rectifier of the PRU may be detected. The NFC coil may then be disconnected form a controller associated with the second receiving coil via a transistor coupling the rectifier to the second receiving coil.

In some scenarios, upon detecting wireless power indicating the power beacon at the rectifier coupled to the first receiving coil may result in a cease of operations of the NFC controller. In this scenario, the PRU may be communicatively coupled to the NFC controller.

As discussed above, initiating the safety component may include, or generate a detuning of the NFC coil. For example, a voltage may be received at the first receiving coil configured for wireless power transition. Upon receipt of the voltage at the first receiving coil, an electrical coupling may be triggered including a transistor associated with the first receiving coil above a predetermined voltage. A capacitor coupled to the transistor may then be triggered. In this scenario, the capacitor may be configured to detune the NFC coil such that the resonant frequency of the NFC coil is modified.

In some scenarios, NFC operations may interrupt wireless power charging. In this scenario, the method 1000 may include broadcasting a BLE signal to a power transmitting unit. The signal may indicate subsequent operation of the NFC coil. Broadcast of the BLE signal may be received at the PTU, and may result in a reduction of power transmitted from the PTU. In some cases, the reduction of power may include ceasing power transfer during the subsequent NFC operations.

Example 1 includes a wireless power receiving unit. The wireless power receiving unit includes a first receiving coil to inductively couple to a wireless power transmitting unit having a transmitting coil. The wireless power receiving unit may also include a safety component to reduce an inductive coupling of the wireless power at a second receiving coil from the wireless power transmitting unit.

Example 2 incorporates the subject matter of Example 1. In this example, the second receiving coil is configured for data communication.

Example 3 incorporates the subject matter of any combination of Examples 1-2. In this example, the second receiving coil is a near field communication (NFC) coil.

Example 4 incorporates the subject matter of any combination of Examples 1-3. In this example, the safety component includes a Bluetooth Low Energy (BLE) module to initiate operation upon a power beacon to be received at the first receiving coil, and a switch coupling the BLE module to the second receiving coil, wherein the second receiving coil is to disconnect from a controller associated with the second receiving coil via the switch upon initiation of the BLE module.

Example 5 incorporates the subject matter of any combination of Examples 1-4. In this example, the safety component includes a rectifier coupled to the first receiving coil to detect wireless power received at the first receiving coil from the power transmitting unit, and a switch coupling the rectifier to the second receiving coil, wherein second receiving coil is to disconnect from a controller associated with the second receiving coil via the transistor upon detection of wireless power.

Example 6 incorporates the subject matter of any combination of Examples 1-5. In this example, the safety component includes a rectifier coupled to the first receiving coil to detect wireless power received at the first receiving coil from the power transmitting unit, and a communicative coupling between the rectifier and a controller associated with the second receiving coil, wherein the controller is to cease operation upon wireless power detection at the rectifier.

Example 7 incorporates the subject matter of any combination of Examples 1-6. In this example, the safety component includes a rectifier coupled to the first receiving coil to receive wireless power from the first receiving coil. The safety component also includes a communicative coupling between the rectifier and a capacitor associated with the second receiving coil, wherein the capacitor is to detune the second receiving coil in response to power received at the rectifier.

Example 8 incorporates the subject matter of any combination of Examples 1-7. In this example, the safety component further includes a transistor having a voltage threshold, and the transistor is to trigger the capacitor associated with the second receiving coil at voltages received above the voltage threshold.

Example 9 incorporates the subject matter of any combination of Examples 1-8. In this example, the safety component includes a Bluetooth Low Energy (BLE) module to broadcast a BLE signal to the power transmitting unit, the signal indicating subsequent operation of the second receiving coil, wherein the BLE signal causes a reduction in power transmitted from the power transmitting unit.

Example 10 incorporates the subject matter of any combination of Examples 1-9. In this example, the second receiving coil is configured for data communication other than near field communication.

Example 11 is a system for increasing safety of wireless systems. The system includes a wireless power receiving coil to inductively couple to a wireless power transmitting coil. The system also includes a wireless data communication receiving coil. The system further includes a safety component to reduce an inductive coupling between the wireless data communication receiving coil and the wireless power transmitting coil.

Example 12 incorporates the subject matter of Example 11. In this example, the wireless data communication receiving coil is a near field communication (NFC) coil.

Example 13 incorporates the subject matter of any combination of Examples 11-12. In this example, the safety component includes a Bluetooth Low Energy (BLE) module to initiate operation upon a power beacon to be received at the wireless power receiving coil. The safety component further includes a switch coupling the BLE module to the wireless data communication receiving coil, wherein the wireless data communication receiving coil is to disconnect from a wireless data communication controller via the switch upon initiation of the BLE module.

Example 14 incorporates the subject matter of any combination of Examples 11-13. In this example, the safety component includes a rectifier coupled to the wireless power receiving coil to detect wireless power received at the wireless power receiving coil from the power transmitting unit. The safety component further includes a switch coupling the rectifier to the wireless data communication receiving coil, wherein wireless data communication receiving coil is to disconnect from a wireless data communication controller via the switch upon detection of wireless power.

Example 15 incorporates the subject matter of any combination of Examples 11-14. In this example, the safety component includes a rectifier coupled to the wireless power receiving coil to detect wireless power received at the wireless power receiving coil from the power transmitting unit. The safety component further includes a communicative coupling between the rectifier and a wireless data communication controller, wherein the wireless data communication controller is to cease operation upon wireless power detection at the rectifier.

Example 16 incorporates the subject matter of any combination of Examples 11-15. In this example, the safety component includes a rectifier coupled to the wireless power receiving coil to receive wireless power from the wireless power receiving coil. The safety component further includes a communicative coupling between the rectifier and a capacitor of the wireless data communication receiving coil, wherein the capacitor is to detune the wireless data communication receiving coil in response to power received at the rectifier.

Example 17 incorporates the subject matter of any combination of Examples 11-16. In this example, the safety component includes a switch having a voltage threshold, wherein the switch is to trigger the capacitor at voltages received above the voltage threshold.

Example 18 incorporates the subject matter of any combination of Examples 11-17. In this example, the safety component includes a Bluetooth Low Energy (BLE) module to broadcast a BLE signal to the power transmitting unit, the signal indicating subsequent operation of the wireless data communication receiving coil, wherein the BLE signal generates a reduction in power transmitted from the power transmitting unit.

Example 19 incorporates the subject matter of any combination of Examples 11-18. In this example, the second receiving coil is configured for data communication other than near field communication.

Example 20 incorporates the subject matter of any combination of Examples 11-19. In this example, the second receiving coil includes an antenna.

Example 21 describes a method for increasing safety of wireless systems. The method includes receiving a power beacon at a first receiving coil from a wireless power transmitting unit having a transmitting coil, and initiating a safety component to reduce inductive coupling of the transmitting coil to a second receiving coil.

Example 22 incorporates the subject matter of Example 21. In this example, the second receiving coil is a near field communication (NFC) coil.

Example 23 incorporates the subject matter of any combination of Examples 21-22. In this example, initiating the safety component to reduce inductive coupling of the transmitting coil to the second receiving coil includes initiating a Bluetooth Low Energy (BLE) module upon receiving the power beacon and disconnecting the second receiving controller form a controller associated with the second receiving coil via a switch coupling the BLE module to the second receiving coil.

Example 24 incorporates the subject matter of any combination of Examples 21-23. In this example, initiating the safety component to reduce inductive coupling of the transmitting coil to the second receiving coil includes detecting wireless power indicating the power beacon at a rectifier coupled to the first receiving coil, and disconnecting the second receiving coil from a controller associated with the second receiving coil via a switch coupling the rectifier to the second receiving coil.

Example 25 incorporates the subject matter of any combination of Examples 21-24. In this example, initiating the safety component to reduce inductive coupling of the transmitting coil to the second receiving coil includes detecting wireless power indicating the power beacon at a rectifier coupled to the first receiving coil, and ceasing operation of a controller associated with the second receiving coil upon wireless power detection.

Example 26 incorporates the subject matter of any combination of Examples 21-25. In this example, initiating the safety component to reduce inductive coupling of the transmitting coil to the second receiving coil includes receiving power at a rectifier coupled to the first receiving coil, and detuning the second receiving coil in response to power received at the rectifier.

Example 27 incorporates the subject matter of any combination of Examples 21-26. In this example, initiating the safety component to reduce inductive coupling of the transmitting coil to the second receiving coil includes receiving a voltage at a switch associated with the first receiving coil above a voltage threshold, and triggering a capacitor associated with the second receiving coil to alter a resonating frequency of the second receiving coil.

Example 28 incorporates the subject matter of any combination of Examples 21-27. In this example, initiating the safety component to reduce inductive coupling of the transmitting coil to the second receiving coil includes broadcasting a Bluetooth Low Energy (BLE) signal to a power transmitting unit, the signal indicating subsequent operation of the second receiving coil, wherein the BLE signal generates a reduction in power transmitted from the power transmitting unit.

Example 29 incorporates the subject matter of any combination of Examples 21-28. In this example, the second receiving coil is configured for data communication other than near field communication.

Example 30 incorporates the subject matter of any combination of Examples 21-29. In this example, the second receiving coil comprises an antenna.

Example 31 describes an apparatus for increasing safety of wireless systems. The apparatus includes means to carry out the method according to any combination of the Examples 21-30.

Example 32 describes an apparatus for increasing safety of wireless systems. The apparatus includes a first receiving means to inductively couple to a wireless power transmitting unit having a transmitting means. The first receiving means may be an antenna of a wireless power receiving unit, such as a receiving coil for wireless power. The transmitting means may be a wireless power transmitter. The apparatus includes a safety component to reduce an inductive coupling of the wireless power at a second receiving means from the wireless power transmitting unit.

Example 33 incorporates the subject matter of Example 32. In this example, the second receiving means is configured for data communication.

Example 34 incorporates the subject matter of any combination of Examples 32-33. In this example, the second receiving means is a near field communication (NFC) antenna.

Example 35 incorporates the subject matter of any combination of Examples 32-34. In this example, the safety component includes a Bluetooth Low Energy (BLE) module to initiate operation upon a power beacon to be received at the first receiving means, and a switch coupling the BLE module to the second receiving means, wherein the second receiving means is to disconnect from a controller associated with the second receiving means via the switch upon initiation of the BLE module.

Example 36 incorporates the subject matter of any combination of Examples 32-35. In this example, the safety component includes a rectifier coupled to the first receiving means to detect wireless power received at the first receiving means from the power transmitting unit, and a switch coupling the rectifier to the second receiving means, wherein second receiving means is to disconnect from a controller associated with the second receiving means via the transistor upon detection of wireless power.

Example 37 incorporates the subject matter of any combination of Examples 32-36. In this example, the safety component includes a rectifier coupled to the first receiving means to detect wireless power received at the first receiving means from the power transmitting unit, and a communicative coupling between the rectifier and a controller associated with the second receiving means, wherein the controller is to cease operation upon wireless power detection at the rectifier.

Example 38 incorporates the subject matter of any combination of Examples 32-37. In this example, the safety component includes a rectifier coupled to the first receiving means to receive wireless power from the first receiving means, and a communicative coupling between the rectifier and a capacitor associated with the second receiving means, wherein the capacitor is to detune the second receiving means in response to power received at the rectifier.

Example 39 incorporates the subject matter of any combination of Examples 32-38. In this example, the safety component includes a transistor having a voltage threshold, wherein the transistor is to trigger the capacitor associated with the second receiving means at voltages received above the voltage threshold.

Example 40 incorporates the subject matter of any combination of Examples 32-39. In this example, the safety component includes a Bluetooth Low Energy (BLE) module to broadcast a BLE signal to the power transmitting unit, the signal indicating subsequent operation of the second receiving means, wherein the BLE signal causes a reduction in power transmitted from the power transmitting unit.

Example 41 incorporates the subject matter of any combination of Examples 32-40. In this example, the second receiving means is configured for data communication other than near field communication.

Example 42 describes Example 1 includes a wireless power receiving unit. The wireless power receiving unit includes a first receiving coil to inductively couple to a wireless power transmitting unit having a transmitting coil. The wireless power receiving unit may also include a safety component to reduce an inductive coupling of the wireless power at a second receiving coil from the wireless power transmitting unit.

Example 43 incorporates the subject matter of Example 42. In this example, the second receiving coil is configured for data communication.

Example 44 incorporates the subject matter of Example 42. In this example, the second receiving coil is a near field communication (NFC) coil.

Example 45 incorporates the subject matter of Example 42. In this example, the safety component includes a Bluetooth Low Energy (BLE) module to initiate operation upon a power beacon to be received at the first receiving coil, and a switch coupling the BLE module to the second receiving coil, wherein the second receiving coil is to disconnect from a controller associated with the second receiving coil via the switch upon initiation of the BLE module.

Example 46 incorporates the subject matter of Example 42. In this example, the safety component includes a rectifier coupled to the first receiving coil to detect wireless power received at the first receiving coil from the power transmitting unit, and a switch coupling the rectifier to the second receiving coil, wherein second receiving coil is to disconnect from a controller associated with the second receiving coil via the transistor upon detection of wireless power.

Example 47 incorporates the subject matter of Example 42. In this example, the safety component includes a rectifier coupled to the first receiving coil to detect wireless power received at the first receiving coil from the power transmitting unit, and a communicative coupling between the rectifier and a controller associated with the second receiving coil, wherein the controller is to cease operation upon wireless power detection at the rectifier.

Example 48 incorporates the subject matter of Example 42. In this example, the safety component includes a rectifier coupled to the first receiving coil to receive wireless power from the first receiving coil. The safety component also includes a communicative coupling between the rectifier and a capacitor associated with the second receiving coil, wherein the capacitor is to detune the second receiving coil in response to power received at the rectifier.

Example 49 incorporates the subject matter of Example 48. In this example, the safety component further includes a transistor having a voltage threshold, and the transistor is to trigger the capacitor associated with the second receiving coil at voltages received above the voltage threshold.

Example 50 incorporates the subject matter of Example 42. In this example, the safety component includes a Bluetooth Low Energy (BLE) module to broadcast a BLE signal to the power transmitting unit, the signal indicating subsequent operation of the second receiving coil, wherein the BLE signal causes a reduction in power transmitted from the power transmitting unit.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A wireless power receiving unit, comprising:
    a first receiving coil to receive wireless power from a wireless power transmitting unit having a transmitting coil;
    a safety circuit coupled to a second receiving coil of a wireless communication unit comprising a controller;
    wherein the safety circuit, when activated, is to reduce an inductive coupling of the wireless power at the second receiving coil to prevent damage to the controller of the wireless communication unit; and
    wherein the safety circuit comprises a capacitor coupled in series with a transistor and coupled to a rectifier configured to receive wireless power from the first receiving coil, wherein the capacitor is to detune the second receiving coil in response to power received at the rectifier.

2. The wireless power receiving unit of claim 1, wherein the second receiving coil is configured for data communication.

3. The wireless power receiving unit of claim 1, wherein the second receiving coil is a near field communication (NFC) coil.

4. The wireless power receiving unit of claim 1, wherein the transistor has a voltage threshold, wherein the transistor is to trigger the capacitor associated with the second receiving coil at voltages received above the voltage threshold.

5. A system for increasing safety of wireless systems, comprising:
    a wireless power receiving coil to receive wireless power from a wireless power transmitting coil;
    a wireless data communication receiving coil coupled to a wireless data communication controller; and
    a safety circuit coupled to the wireless data communication receiving coil, wherein the safety circuit, when activated, is to reduce an inductive coupling between the wireless data communication receiving coil and the wireless power transmitting coil, and wherein the safety circuit is to be activated during wireless charging to prevent damage to the wireless data communication controller;
    wherein the safety circuit comprises a capacitor coupled in series with a transistor and coupled to a rectifier configured to receive wireless power from the wireless power receiving coil, wherein the capacitor is to detune the wireless data communication receiving coil in response to power received at the rectifier.

6. The system for increasing safety of wireless systems of claim 5, wherein the wireless data communication receiving coil is a near field communication (NFC) coil.

7. The system for increasing safety of wireless systems of claim 5, wherein the transistor has a voltage threshold, wherein the transistor is to trigger the capacitor at voltages received above the voltage threshold.

8. A method for increasing safety of wireless systems, comprising:
    receiving a power beacon at a first receiving coil from a wireless power transmitting unit having a transmitting coil;
    activating a safety circuit coupled to a second receiving coil, wherein the second receiving coil is coupled to a wireless communication controller and wherein activating the safety circuit is to reduce inductive coupling of the transmitting coil to the second receiving coil to prevent damage to the wireless communication controller;
    wherein activating the safety circuit comprises a capacitor coupled in series with a transistor and coupled to a rectifier, wherein the capacitor is to detune the second receiving coil in response to power received at the rectifier configured to receive wireless power from the first receiving coil.

9. The method for increasing safety of wireless systems of claim 8, wherein the second receiving coil is a near field communication (NFC) coil.

10. The method for increasing safety of wireless systems of claim 8, wherein detuning comprises:
    receiving, from the rectifier, a voltage at the transistor above a voltage threshold,
    triggering wherein the voltage turns on the transistor to activate a capacitor coupled to the second receiving coil to alter a resonating frequency of the second receiving coil.

* * * * *